United States Patent [19]

Buckner

[11] Patent Number: 5,392,809
[45] Date of Patent: Feb. 28, 1995

[54] HYPER-RESET PRESSURE CONTROLLER

[75] Inventor: Steve Buckner, Homewood, Ill.

[73] Assignee: Acme Steel Company, Riverdale, Ill.

[21] Appl. No.: 147,539

[22] Filed: Nov. 5, 1993

[51] Int. Cl.⁶ .............................................. G05D 16/02
[52] U.S. Cl. ...................................... 137/488; 137/83; 137/85
[58] Field of Search ........................... 137/83, 85, 488

[56] References Cited

U.S. PATENT DOCUMENTS

| | | | |
|---|---|---|---|
| 2,377,300 | 5/1945 | Pray | 137/83 |
| 3,590,840 | 7/1971 | Hyer . | |
| 3,621,655 | 11/1971 | Hawes . | |
| 3,682,191 | 8/1972 | Lechner, Jr. . | |
| 3,695,283 | 10/1972 | Ringwall . | |
| 3,760,840 | 9/1973 | Gates . | |
| 4,265,116 | 5/1981 | Evans . | |
| 4,276,895 | 7/1981 | Drzewiecki . | |
| 4,644,781 | 2/1987 | Mon . | |
| 4,874,016 | 10/1989 | Tseng . | |

OTHER PUBLICATIONS

Publication Hydraulic Stabilizer Instructions (13-500) (undated).

Primary Examiner—Robert G. Nilson
Attorney, Agent, or Firm—Hill, Steadman & Simpson

[57] ABSTRACT

A hyper-reset pressure controller which includes two separate feedback paths which results in a substantially smoother and more accurate pressure control.

6 Claims, 2 Drawing Sheets

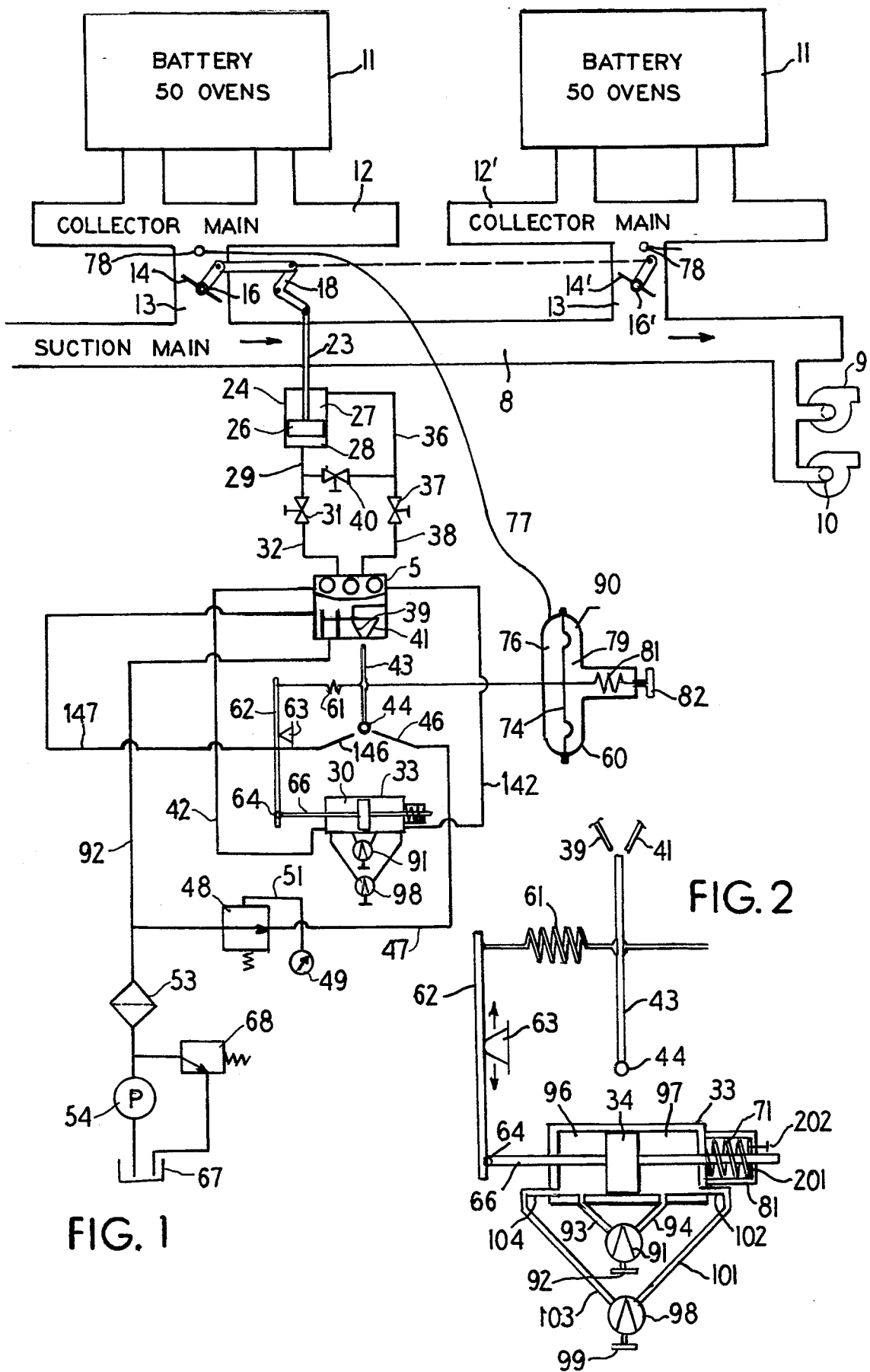

HYPER-RESET PRESSURE CONTROLLER

BACKGROUND OF THE INVENTION

1. Field of the invention

This invention relates to a pressure control.

2. Description of Related Art

In the manufacture of a steel and iron large ovens are used which are charged with coal-coke. The oven drives off volatiles so as to make coke. Coke oven gases evolved through this process are pumped to the by-products plant for processing. A motor or steam turbine has an output shaft which drives an exhauster so as to move collector gas to the by-products plant.

The back pressure in the ovens must be closely controlled and a large number of ovens are connected to each other to form a battery and the battery is connected to a back pressure controller which controls the correct pressure in the battery. In a particular application, a collector main has a gas pressure of eight millimeters back pressure. This is controlled by a valve mounted downstream. On the other side of the valve suction occurs. In prior art control systems, the pressure in the collector main has varied as shown by FIG. 3 which has a number of spikes illustrating the pressure variation which is undesirable. Charging spikes, representing instantaneous pressure fluctuations, were considered by the iron and steel industry to be normal during operations of the charging of coke ovens. With the introduction of increased federal regulations there arose a necessity for better control of gas leakage from the coke ovens. This improved level of control was achieved partially through back pressure control. FIG. 3 was made with a GPE Controls, Inc. Jet Pipe Regulator with proportional reset action. See also U.S. Pat. Nos. 3,695,283, 3,682,191, 3,621,655, 4,644,781, 3,760,840, 4,265,116, 4,276,895, 3,590,840 and 4,874,016.

SUMMARY OF THE INVENTION

It is an object of the present invention to provide a hyper-reset pressure controller which is very precise and which eliminates pressure spikes which occur in controllers of the prior art. So as to reduce spikes and maintain the pressure substantially constant at the set point, an additional conduit is connected between the two sides of the stabilizer piston so as to equalize and eliminate pressure spikes in the controlled process. Such spikes in the industry had been considered normal until this invention. New Federal Environmental Regulations require more accurate control than the prior art.

The present invention provides an improved control which substantially eliminates fluctuations in the pressure being controlled.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a schematic view of the invention;

FIG. 2 is an enlarged detailed view of the invention;

DETAILED DESCRIPTION OF THE PREFERRED EMBODIMENTS

Figure 3:
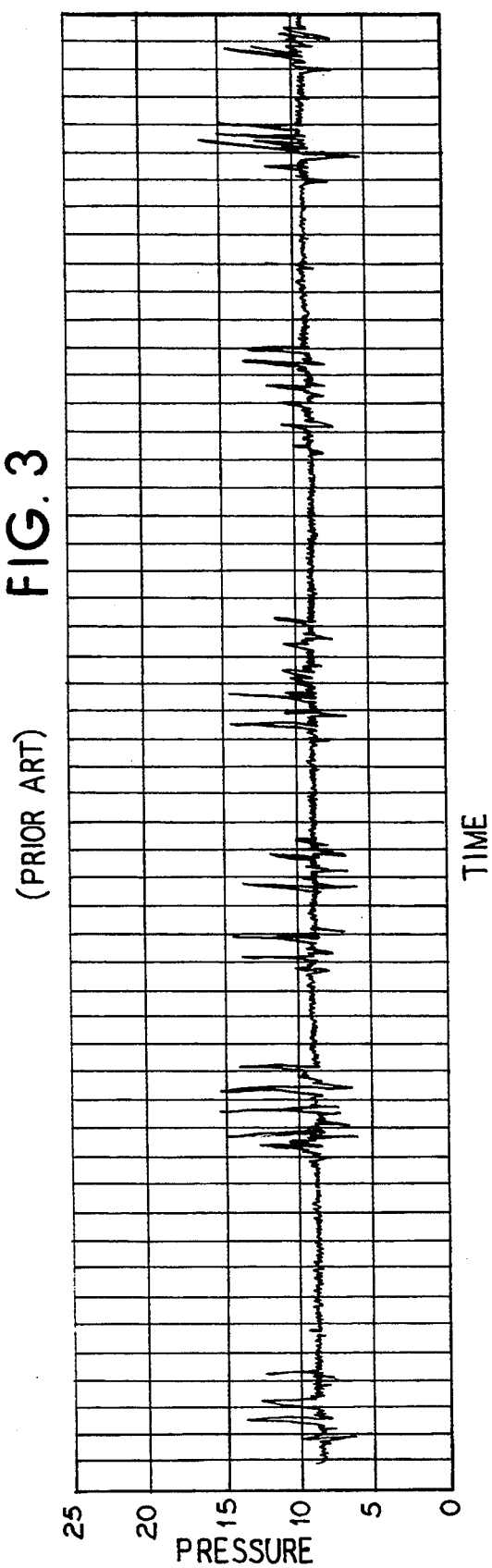
FIG. 3 is a plot of pressure variations versus time for a prior art system.

FIG. 1 illustrates the hydraulic stabilizer of the invention. The control system maintains the pressure from a plurality of ovens 11. Each oven individually is connected to the collector main 13 which connects to a crossover main 13 in which a butterfly valve 14 is mounted on a shaft 16. A lever arm 17 connects to the shaft 16 and is pivotally connected to a pivotal L-shaped link 18 which connects to a to a piston rod 23 for a piston 26 mounted in power cylinder 24. An electric motor driven pump 9 or a steam turbine driven pump 10 are connected to a suction main so as to move gas through the suction main 8.

Within cylinder 24, a first space 27 is formed on the top of the cylinder and a second space 28 is formed on the bottom of the cylinder relative to FIG. 1. A tube 29 is connected to the space 28 of the cylinder and passes through a valve 31 to a tube 32 which passes through distributor 5 and through a tube 42 to the left end 30 of a stabilizer cylinder 33. A tube 142 connects the right end of stabilizer cylinder 33 to distributor 5. A tube 36 is connected to the upper end of cylinder 24 and passes through a valve 37 and a tube 38 to a nozzle 39 which terminates adjacent the output end of a jet pipe 43. A second nozzle 41 is mounted adjacent the output of the jet pipe 43 and is connected to a tube 42 which is connected to the left end of cylinder 33. A valve 40 is connected between tubes 29 and 36. The jet pipe 43 is pivotally connected at pivot 44 and has its left side connected by spring 61 to a link 62 which is engaged by a fulcrum 63. A pivot pin 64 connects link 62 to the piston rod 66 of a piston 34 mounted in stabilizer cylinder 33. A spring 71 mounted in an extension 81 of cylinder 33 is connected to piston rod 66. A washer 201 and a set screw 202 allow the tension of the spring 71 on the piston rod 66 to be adjusted.

A pump 54 receives an input from a fluid supply 67 and supplies an output through filter 53 to tube 92 which is connected to a pressure setting valve 48 which is connected by tube 51 to pressure indicator 49. The tube 92 establishes a pressure in distributor 5. A relief valve 68 is connected between the output of the pump and the supply 67. A tube 47 is connected to nozzle 46 which supplies fluid to jet pipe 43. A tube 147 connects a nozzle 146 to distributor 5. A diaphragm container 60 contains a diaphragm 74 which has a chamber 79 on one side as, for example, the right side which is connected to atmosphere by tube 90. The other side 76 of the diaphragm 74 is connected by a tube 77 to a pressure sensor 78 mounted in suction main 8, as illustrated. A spring 81 is connected between the diaphragm 74 and a control knob 82 so as to allow a set point of the desired pressure to be set. A internal passage 93 is connected to the space 96 on the left side of the piston 34 and another internal passage 94 is connected to the space 97 on the right side of piston 34. The passages 93 and 94 are connected to the valve 91 which can be controlled by the valve knob 92 which is an integral part of the stabilizer. A tube 101 has one end 102 connected to the space 97 on the right side of the piston 34 and has its other end connected to a valve 98 which has a control knob 99. A tube 103 has its end 104 connected to the space 96 on the left end of piston 34. In a specific installation, the tubes 101 and 103 have inside diameters of 0.307 inch.

In operation, the jet pipe 43 discharges fluid at the two closely spaced orifices 39 and 41. When the process pressure is at the set point, the jet pipe 43 is centered between the orifices 39 and 41 by a balance of forces and both the stabilizer piston 34 and the power cylinder piston 26 will be stationary.

An increase of the process pressure above the set point changes the force that is exerted by the diaphragm 74 and springs 81 and 61 upon the jet pipe 43 and moves it to the right relative to FIG. 1. This causes piston 26 to move in a direction so as to close the butterfly valve 14. At the same time, the piston 34 which is in the same hydraulic circuit as piston 26 is also displaced to the right and thereby extends the stabilizing spring 61 by an amount directly proportional to the travel of piston 34. The extension of spring 61 tends to return the jet pipe 43 to its center position by balancing the forces acting on it. Thus, a feedback signal to the jet pipe 43 is obtained which provides proportional position action. The proportional relationship can be changed by moving the moveable fulcrum 63 up and down as shown by the arrows on either side of it in FIG. 2

So as to obtain reset characteristics, a bypass comprising the internal passages 93 and 94 and valve 91 and knob 92 are provided around the piston 34 with spring 71 which tends to bring the piston 34 back to its center position.

If in the balanced condition, piston 34 has assumed a displacement to the right, due to the flow through the bypass 93, 91 and 94 and the action of spring 71, piston 34 will gradually return to its center position. This moves the jet pipe 73 and with it piston 26 at a rate which is determined by valve 91 in the bypass. The hyper-reset bypass comprising the tubes 101 and 103 and valve 98 with its set control 99 provides a system which is substantially stabler than the prior art system which had only the single bypass system comprising the tubes 93, and 94 and valve 92.

For example, FIG. 3 is a plot for a prior art device showing pressure variations 101 plotted against time with a system which does not include the tubes 101 and 103 and the valve 98. It is to be noted that a substantial pressure variation occurred about the set point as shown by the curve 101.

Figure 4:
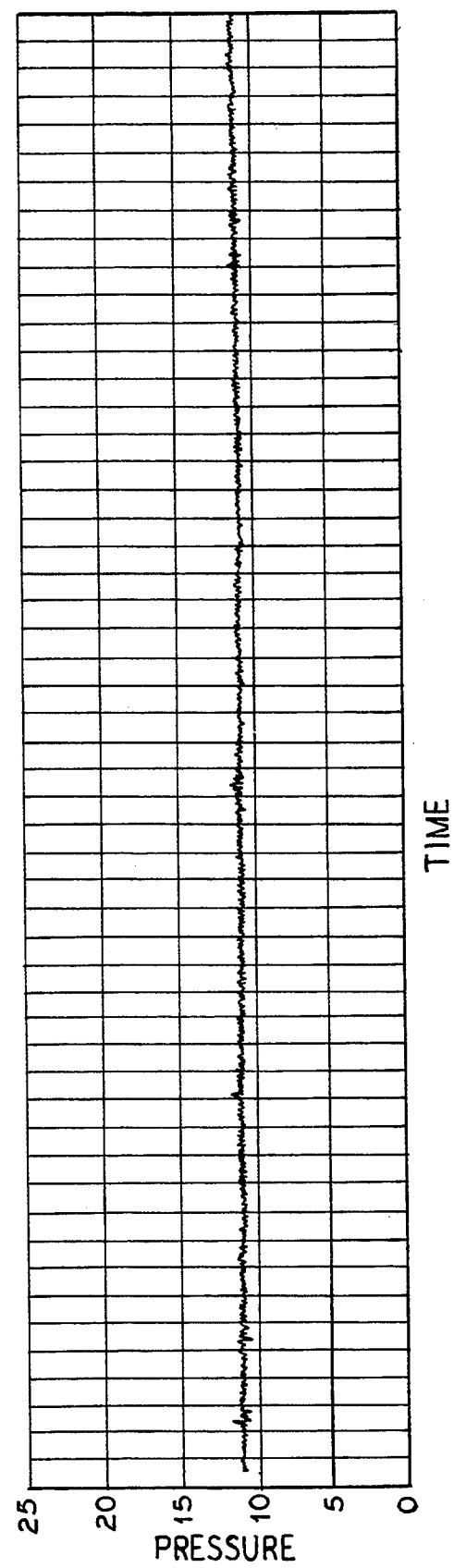
FIG. 4 is a plot of pressure variations versus time for the invention.

FIG. 4 is a plot 102 of pressure variations of a system which included the tubes 101 and 103 and valve 98. It is to be noted that the pressure fluctuations have been substantially eliminated in this embodiment. Thus, the invention results in more accurate and stable control of pressure in the system than does the system of the prior art.

It is our experience that prior art equipment limitations did not control coke oven gas to a desired level. In particular, when valve 91 was at the end of its range, in the fully open position, the reset time was such that 3–4 mm spikes resulted. For improved control over coke oven gas leakage, it was discovered that if piston 34 returned to its center position in less time that back pressure control would be improved. This improved control was achieved by expanding the range of the stabilizer reset time. The addition of an external by-pass tube achieved this improved reset time. Equalization was achieved by equalizing the displacement of oil (hydraulic fluid) across piston 34. Less reset time was achieved and charging spikes (gas leakage) was significantly reduced.

Although the invention has been described with respect to preferred embodiments, it is not to be so limited as changes and modifications can be made which are within the full intended scope of the invention as defined by the appended claims.

I claim as our invention:

1. A hyper-reset pressure controller for controlling pressure in a main comprising;
    a control valve mounted in said main,
    a power cylinder with a power piston therein coupled to said control valve, a stabilizer cylinder with a control piston, one side of said power cylinder connected to one side of said stabilizer cylinder, a jet pipe with one end pivotally supported, first and second nozzles mounted adjacent the second end of said jet pipe, said first nozzle connected to the one side of said power cylinder, said second nozzle connected to the other side of said stabilizer cylinder,
    a pivoted link with one end connected to said jet pipe and a second end connected to said stabilizer piston, a diaphragm container with a diaphragm mounted therein which is coupled to said jet pipe, one side of said diaphragm connected to atmospheric pressure and the other side connected by a tube to the pressure within said main, a first feedback internal passage connected between the first and second ends of said stabilizer cylinder, and a second feedback tube connected between the first and second ends of said stabilizer cylinder.

2. A hyper-reset pressure controller for controlling pressure according to claim 1 including a first feedback valve in said first feedback internal passage and a second feedback valve in said second feedback tube.

3. A hyper-reset controller for controlling pressure according to claim 2 including first spring means connected to said stabilizer piston.

4. A hyper-reset controller for controlling pressure according to claim 3 including second spring means connected to said diaphragm.

5. A hyper-reset controller for controlling pressure according to claim 4 wherein the inside diameter of said second feedback tube is about 0.307 inch.

6. A hyper-reset controller according to claim 4 wherein pressure is controlled in ovens.

* * * * *